(12) United States Patent
Tarahomi

(10) Patent No.: US 6,575,521 B2
(45) Date of Patent: Jun. 10, 2003

(54) COMPOSITE REMOVABLE HARD TOP

(75) Inventor: Sassan Tarahomi, Brighton, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/184,268

(22) Filed: Jun. 26, 2002

(65) Prior Publication Data

US 2002/0166235 A1 Nov. 14, 2002

Related U.S. Application Data

(60) Continuation of application No. 09/621,386, filed on Jul. 21, 2000, now Pat. No. 6,438,843, which is a division of application No. 09/469,198, filed on Dec. 21, 1999, now Pat. No. 6,135,535.

(51) Int. Cl.[7] .............................. B62D 25/06; B60J 7/11
(52) U.S. Cl. ........................ 296/103; 296/218; 296/210
(58) Field of Search ................................ 296/103, 210, 296/218, 102, 188, 224; 292/DIG. 5, DIG. 42; 29/897.2

(56) References Cited

U.S. PATENT DOCUMENTS

| | | | |
|---|---|---|---|
| 3,427,068 A | | 2/1969 | Keahn et al. |
| 3,603,636 A | * | 9/1971 | Carella et al. ............... 296/218 |
| 4,133,576 A | * | 1/1979 | Chrysler ...................... 296/218 |
| 4,195,866 A | * | 4/1980 | Tundo et al. .......... 292/DIG. 5 |
| 4,220,368 A | | 9/1980 | Ferrigan |
| 4,261,615 A | | 4/1981 | Deaver |
| 4,466,644 A | | 8/1984 | Wooten et al. |
| 4,469,370 A | | 9/1984 | Petersen |
| 4,548,434 A | * | 10/1985 | Princell .................. 292/DIG. 5 |
| 4,582,358 A | * | 4/1986 | Draper ....................... 296/218 |
| 4,589,230 A | | 5/1986 | Yonemura et al. |
| RE32,165 E | | 6/1986 | Gerring |
| 4,595,230 A | | 6/1986 | Fettes |
| 4,662,672 A | | 5/1987 | Yamamoto et al. |
| 4,723,812 A | * | 2/1988 | Masuda et al. ............. 296/218 |
| 4,746,163 A | * | 5/1988 | Muscat ....................... 296/218 |
| 4,819,983 A | | 4/1989 | Alexander et al. |
| 4,821,394 A | * | 4/1989 | Martinez-Vera ............. 296/218 |
| 4,978,161 A | * | 12/1990 | Schulze ....................... 296/102 |
| 5,009,463 A | | 4/1991 | Saitoh et al. |
| 5,009,938 A | | 4/1991 | Raj |
| 5,018,783 A | * | 5/1991 | Chamings et al. .......... 296/218 |
| 5,033,788 A | | 7/1991 | Raj |
| 5,085,483 A | | 2/1992 | Alexander |
| 5,205,607 A | * | 4/1993 | Takeuchi .................... 296/218 |
| 5,267,774 A | * | 12/1993 | Garner et al. ............... 296/218 |
| 5,342,107 A | | 8/1994 | Saji et al. |
| 5,346,267 A | | 9/1994 | Betteridge et al. |
| 5,427,429 A | | 6/1995 | Piotek et al. |
| 5,489,134 A | * | 2/1996 | Furuki et al. ........ 292/DIG. 42 |
| 5,489,146 A | | 2/1996 | Fischbach |
| 5,544,934 A | | 8/1996 | Murkett et al. |
| 5,671,968 A | * | 9/1997 | Masuda et al. ............. 296/188 |
| 5,725,273 A | * | 3/1998 | Vernon et al. ............. 296/218 |
| 5,779,299 A | | 7/1998 | Purcell et al. |

(List continued on next page.)

FOREIGN PATENT DOCUMENTS

| | | |
|---|---|---|
| EP | 0301193 A | 2/1989 |
| EP | 0430423 A | 6/1991 |
| EP | 000611673 A1 | 8/1994 |
| JP | 406227264 A | 8/1994 |

*Primary Examiner*—Kiran Patel
(74) *Attorney, Agent, or Firm*—Brooks & Kushman P.C.

(57) ABSTRACT

A removable hardtop including inner and outer roof panels made of molded fiber reinforced sheet molding compound. An integral roll bar is formed in the inner roof panel. A hold down clamp and bracket having horizontal, vertical and transverse flanges mounted on a horizontal edge, vertical surface and transverse surface of a B pillar of a vehicle. A method of molding the inner and outer roof panels and assembling component parts to the inner and outer roof panels is also disclosed.

11 Claims, 10 Drawing Sheets

U.S. PATENT DOCUMENTS

| | | | |
|---|---|---|---|
| 5,829,825 A | | 11/1998 | Kim |
| 5,839,778 A | * | 11/1998 | Schaible et al. ............ 296/224 |
| 5,887,939 A | * | 3/1999 | Yamaguchi et al. ........ 296/210 |
| 5,950,366 A | * | 9/1999 | Uhlmeyer ................... 296/218 |
| 6,003,936 A | * | 12/1999 | Gordon ...................... 296/218 |
| 6,007,146 A | * | 12/1999 | Reuter et al. ............... 296/103 |
| 6,036,254 A | | 3/2000 | Ritter et al. |
| 6,059,356 A | | 5/2000 | Hoelzel et al. |
| 6,135,535 A | * | 10/2000 | Tarahomi ................... 296/103 |
| 6,168,231 B1 | * | 1/2001 | Fielding et al. ............. 296/210 |
| 6,299,244 B1 | * | 10/2001 | Tarahomi ................... 296/210 |
| 6,438,843 B1 | * | 8/2002 | Tarahomi ................... 296/210 |
| 6,470,573 B2 | * | 10/2002 | Tarahomi .................. 29/897.2 |

\* cited by examiner

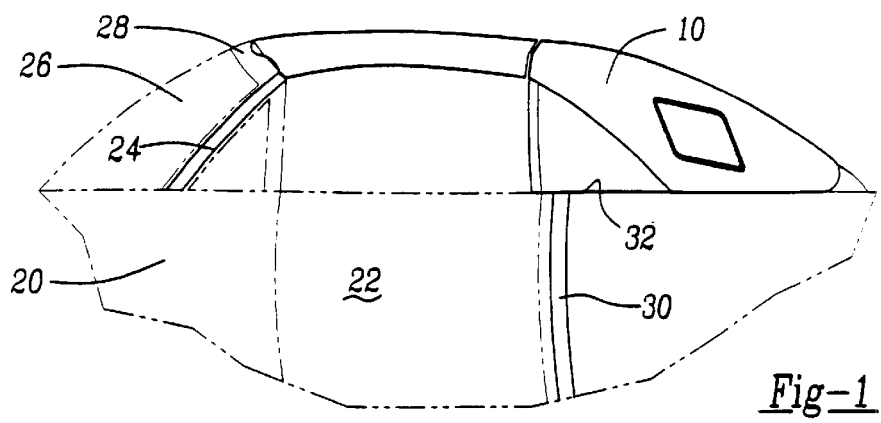
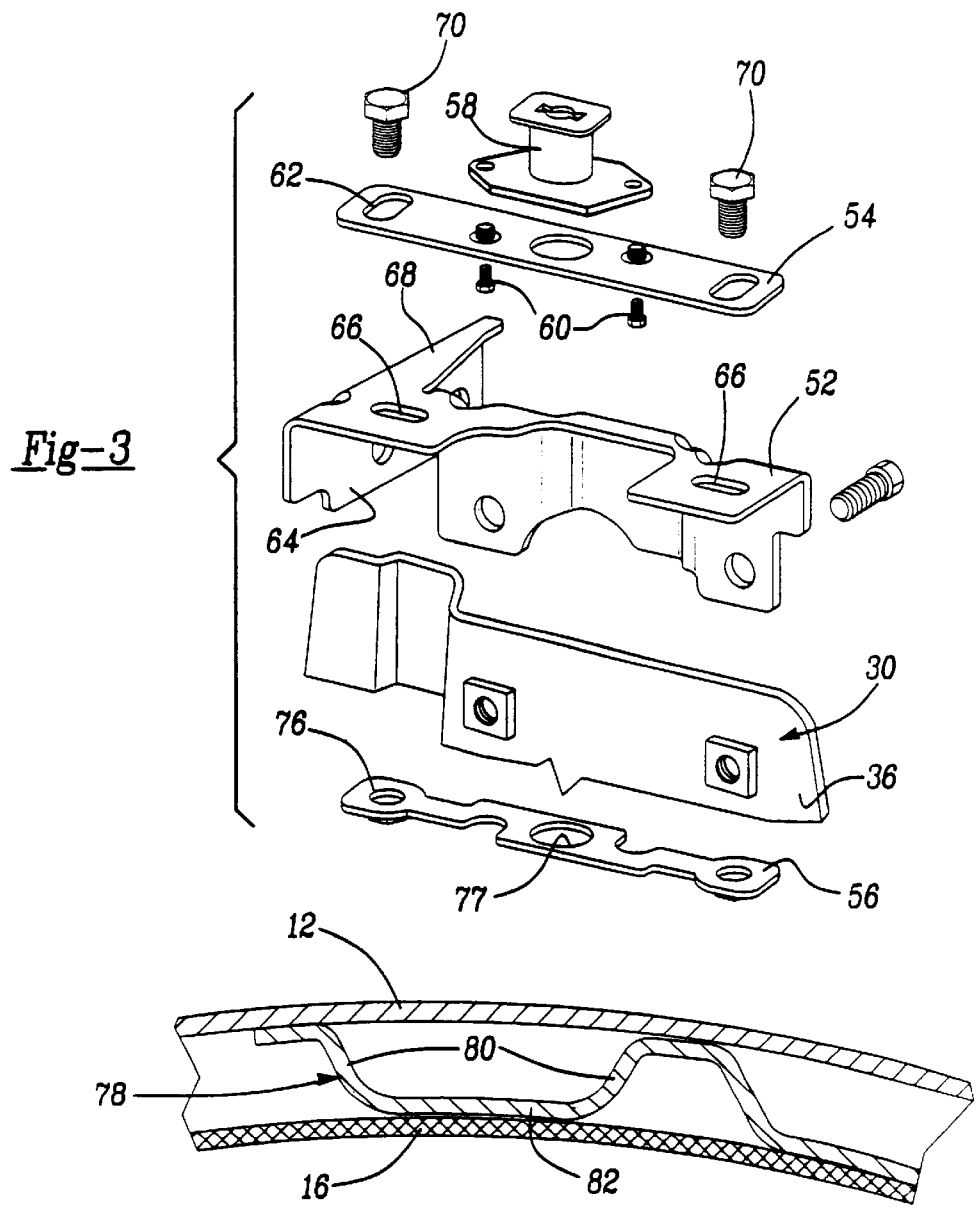

COMPOSITE REMOVABLE HARD TOP

This is a continuation of application Ser. No. 09/621,386 filed Jul. 21, 2000, now U.S. Pat. No. 6,438,843 which is a divisional of Ser. No. 09/469,198 (now U.S. Pat. No. 6,135,535) filed Dec. 21, 1999.

TECHNICAL FIELD

The present invention relates to a removable roof for a vehicle and a method of making a removable roof.

BACKGROUND ART

Removable roofs are known for use in conjunction with convertible vehicles including premium vehicles such as the BMW 325 CI, BMW Z3, and as, disclosed in U.S. Pat. No. 5,489,146 to Fischbach. Removable hard tops address one drawback of convertible vehicles by providing a durable top for a vehicle during the winter months while the convertible top may be kept in its stowed position protecting it against the elements.

Prior art removable hard tops are normally built on a frame having multiple components to which rigid panels are assembled. In an effort to improve rollover protection, metal roll bars may be incorporated into the removable roof structure or an active roll bar system may be incorporated in other portions of the passenger compartment. Removable tops having a separate frame are expensive to manufacture and are relatively heavy. As vehicles are normally assembled there is a limited amount of twisting and tolerance stack up that can result in variances in vehicle mounting locations that can complicate securing a removable roof to the vehicle.

Styling requirements may limit the space available for hold down clamps used to secure the sides of a removable top to a vehicle. The inclusion of side windows in a removable top imposes substantial limitations on the space available for hold down clamp assemblies. While it is desirable to provide larger, more robust hold down clamp assemblies, space limitations and weight reduction considerations provide challenges in the design of removable vehicle roofs and their associated hold down clamp structures.

These and other problems and challenges are addressed by Applicant's invention as summarized below.

DISCLOSURE OF INVENTION

According to the present invention, a method of making a removable roof for a vehicle is provided. The method includes forming an outer panel of the roof in a heated mold from a sheet of thermoset plastic resin having fiber reinforcement material distributed in the resin. The thermoset plastic resin sheet is formed in the mold to the net size and shape of the roof outer panel. An inner panel of the roof is similarly formed in a second mold from a second sheet of thermoplastic resin with fiber reinforcement material distributed in the resin. The second sheet is formed to the net size and shape of the roof inner panel. The inner and outer roof panels are both trimmed and assembled to appropriate mounting brackets and locking assemblies that are assembled to the inner roof panel. The roof outer panel and roof inner panels are bonded together to form a removable roof for a vehicle.

One aspect of the invention is the formation of an integral roll bar on the roof inner panel as the roof inner panel is molded. The integral roll bar is designed to withstand a 5,000 pound load or one and one half times the unloaded vehicle weight, whichever is less.

According to another aspect of the invention, the inner and outer roof panels are formed from sheets of a sheet molding compound of thermoset plastic resin that is reinforced with either glass fibers, carbon fibers, polyacrylonitrile or a combination thereof.

According to the invention, a removable roof for a vehicle is provided for a vehicle having a windshield including a header on an A pillar located in front of the front vehicle doors and a B pillar located in front of and rearward of the front vehicle doors, respectively. The removable roof has a fiber reinforced thermoset resin inner and outer panel. The inner panel preferably includes an integrally formed roll bar. The removable roof for a vehicle is detachably secured to the vehicle by means of four attachment points two of which are right and left hold down clamp assemblies that are secured to hold down bracket assemblies that are secured to the B pillar of the vehicle. A windshield header attachment bracket is secured to a front portion of the inner roof panel. Right and left roof hold down clamp assemblies and right and left roof latch reinforcement plates are secured to right and left sides of the inner panel of the roof. Right and left hold down bracket assemblies each comprise an upper plate, a bracket and a lower plate that are secured together and to the B pillar of the vehicle by fasteners.

According to another aspect of the removable roof of the present invention, the removable roof may be formed with a side surface from which side window openings may be cut out after molding. The inner panel of the roof may also be formed with cavities below and forward of the side window openings in which roof hold down clamp assemblies may be secured.

According to another aspect of the invention, a pivotal shaft is rotatably retained in each of the mounting brackets wherein a cam is secured on one end to each of the pivotal shafts that are received by each of the hold down bracket assemblies. A cam follower may be attached to each of the B pillar brackets for receiving the cam of each of the pivotal shafts and providing an engagement point for the cams to pull the clamp assemblies into engagement with the hold down bracket assemblies. B pillar brackets are preferably assembled to reinforcement plates and fastener retention plates that are assembled together with fasteners that extend through fastener receptacle holes. The B pillar bracket preferably includes a horizontally extending flange, a longitudinally extending flange, and a transversely extending flange that are mounted to a horizontal edge, and longitudinal surface of the B pillar. Elongated slots preferably provided in the B pillar brackets permit adjustment of the location of the B pillar bracket fore and aft and transversely and longitudinally to compensate for variations in vehicle roof locating positions.

These and other aspects, objects and advantages of the present invention will be better understood by one of ordinary skill in the art upon review of the attached drawings and following detailed description of the drawings and of the best mode of practicing the invention.

BRIEF DESCRIPTION OF DRAWINGS

FIG. 1 is a fragmentary side elevation view of a vehicle having a removable roof made according to the present invention.

FIG. 3 is an exploded perspective view of a hold down bracket assembly for a removable vehicle roof;

FIG. 4 is a cross-sectional view taken along the line 4—4 in FIG. 2;

BEST MODE FOR CARRYING OUT THE INVENTION

Figure 2:
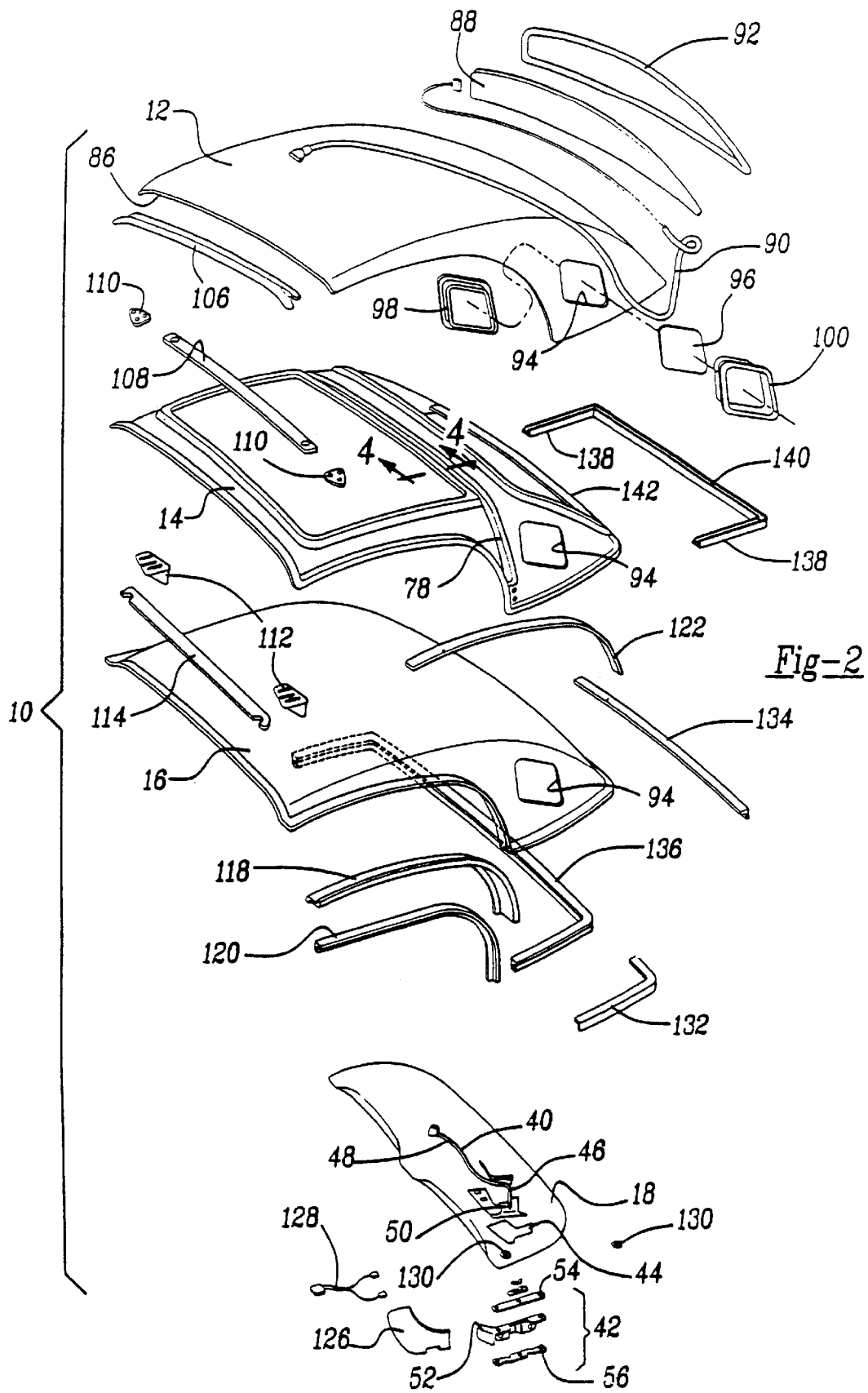
FIG. 2 is an exploded perspective view of a removable roof for a vehicle.

Referring now to FIGS. 1 and 2, a removable roof assembly 10 is shown that includes a molded outer roof panel 12 and a molded inner roof panel 14 that are secured together. A head liner 16 is preferably clipped, fastened, or bonded to the inner roof panel 14 on the opposite side from the outer roof panel 12. A package tray or tonneau cover 18 forms part of the convertible vehicle 20 to which the roof assembly 10 is adapted to be secured. Vehicle 20 includes a door 22 that provides ingress and egress to the front seat (not shown) of the vehicle 20. It should be understood that the present invention may be used with either two-door or four-door vehicles.

The following description and the drawings illustrate the component parts for the left side but does not in every instance describe or illustrate the corresponding right side parts for clarity and brevity. It should be understood that the right side includes mirror image parts corresponding to the left side parts described. When reference is made to a side part it should be understood that both right and left sides are generally provided in the completed assembly.

Referring to FIG. 1, vehicle 20 including the roof assembly 10 is shown to illustrate the environment of the roof assembly of the present invention. The door 22 of the vehicle 20 is connected by a hinge to the A pillar 24 of the vehicle 20 rearward of the windshield 26. The windshield 26 includes a header 28 to which the roof assembly 10 is joined as will be more particularly described below. The vehicle also includes a B pillar 30 that terminates at the belt line 32 of the vehicle. As shown in FIG. 3, the B pillar 30 on its upper end includes a horizontal edge 34 and a longitudinal surface 36.

Referring now to FIG. 2, a hold down clamp assembly 40 is provided on the roof assembly 10 and is adapted to be secured to the hold down bracket assembly 42 that is mounted on the horizontal edge 34 and longitudinal surface 36 of the B pillar 30. The hold down clamp assembly 40 is secured to the inner roof panel by a hold down clamp mounting plate 44. Hold down clamp assembly 40 includes a pivotal shaft 46 and a lever 48. A cam 50 is provided on the distal end of the pivotal shaft 46 and is adapted to be rotated by moving the lever 48 whereby the hold down clamp assembly may be secured or released from the hold down bracket assembly 42.

As shown in FIGS. 2 and 3, the hold down bracket assembly 42 includes a bracket 52 that is secured to the B pillar 30. A reinforcement plate 54 is secured to and reinforces the bracket 52. A fastener retention plate 56 is provided on the opposite side of the bracket plate 52 from the reinforcement plate 54. A cam track cylinder 58 is secured by fasteners 60 to the bracket 52. Cam track cylinder 58 includes a track in which the cam 50 is received that pulls the hold down clamp assembly 40 to the hold down bracket assembly 42 as the lever 48 is rotated.

A transverse slot 62 is provided in the reinforcement plate 54. A transverse flange 64 is provided on the bracket 52. Longitudinal slot 66 is formed in horizontal flange 68. Bolts 70 are provided that extend through the transverse slot 62 and longitudinal slot 66 that are received by weld nuts 72 which are secured to the fastener retention plate 56. Weld nuts 72 are aligned with hole 76 through which the bolt 70 will pass. A pilot hole 77 is provided in the hold down bracket assembly 42 for passage of the cam 50 and pivotal shaft 46 that extends through the reinforcement plate 54, B-pillar 30 and fastener retention plate 56.

Referring now to FIGS. 2 and 4, a roll bar 78 is integrally formed as part of the inner roof panel 14. The rollbar 78 includes legs 80 that are interconnected by a bridge section 82. The construction of the rollbar 78 may include additional or special reinforcement fibers and is configured to provide crush strength sufficient to satisfy proposed or actual motor vehicle safety standards.

Referring now to FIG. 1, the windshield header 28 is engaged by a front portion of the roof 86.

Referring now to FIG. 2, rear window 88 is provided in the roof assembly 10. The rear window 88 may include an electrical defrost mechanism (not shown) for which a defrost wiring harness 90 is shown. The rear window 88 is secured over an opening in the roof assembly 10 that extends through the inner and outer roof panels 14 and 12 and the head liner 16 that are sized to correspond to the dimensions of the rear window 88. A rear window molding 92 is shown for securing the rear window 88 to the roof assembly 10 and sealing about the rear window 88.

A side window opening 94 is provided in the outer roof panel 12, inner roof panel 14, and head liner 16. A side window 96 is assembled over the side window opening 94 by an inner support ring 98 and an outer mounting and trim ring 100.

A cavity, (not shown) is preferably formed forward of the side window 96 and adjacent the belt line 32 of the vehicle. The hold down clamp assembly 40 is preferably received in the cavity (not showed) to minimize the extent to which the hold down clamp assembly 40 protrudes into the passenger compartment of the vehicle 20.

With continuing reference to FIG. 2, additional parts of the roof assembly 10 that are located in the front portion 86 and engage the header 28 will be described in greater detail. The front roof drip molding 106, front roof seal plate 108, front roof inner plate 110, front roof connector 112, and front roof trim molding 114 are all secured to the front portion of the roof 86. The seal plate 108 is preferably bonded to the inner roof panel prior to assembly to the outer roof panel 12. The seal plate 108 preferably includes tapped holes or other mechanisms for securing other components of the roof in the front portion of the roof 86.

Both sides of the roof assembly 10 are provided with a side roof drip molding 118, a side roof rail weather strip 120 and a side roof inner tapping plate 122. The side roof inner tapping plate 122 is preferably bonded to the inner roof panel 14 prior to assembling the inner roof panel 14 to the outer roof panel 12. The side roof inner tapping plate 122 provides rigidity and a durable member to which the drip molding and weather strip 118 and 120, respectively, are secured.

A hold down bracket cover 126 is provided to cover the hold down bracket assembly 42. A wiring harness 128 is provided to allow for the hold down clamp assembly 40 to be monitored by means of sensors (not shown). Electrical connectors 130 are shown for connecting sensors to the hold down clamp assembly 40 or hold down bracket assembly 42 to provide a convenient system for monitoring the position of the hold down clamp assembly.40. A side molding retainer 132 is secured to the outside of the outer roof panel 12 as is a center molding retainer 134. Rear seal 136 and side moldings 138 and center molding 140 are secured to the lower rear edge 142 of the roof assembly 10.

Figure 5:
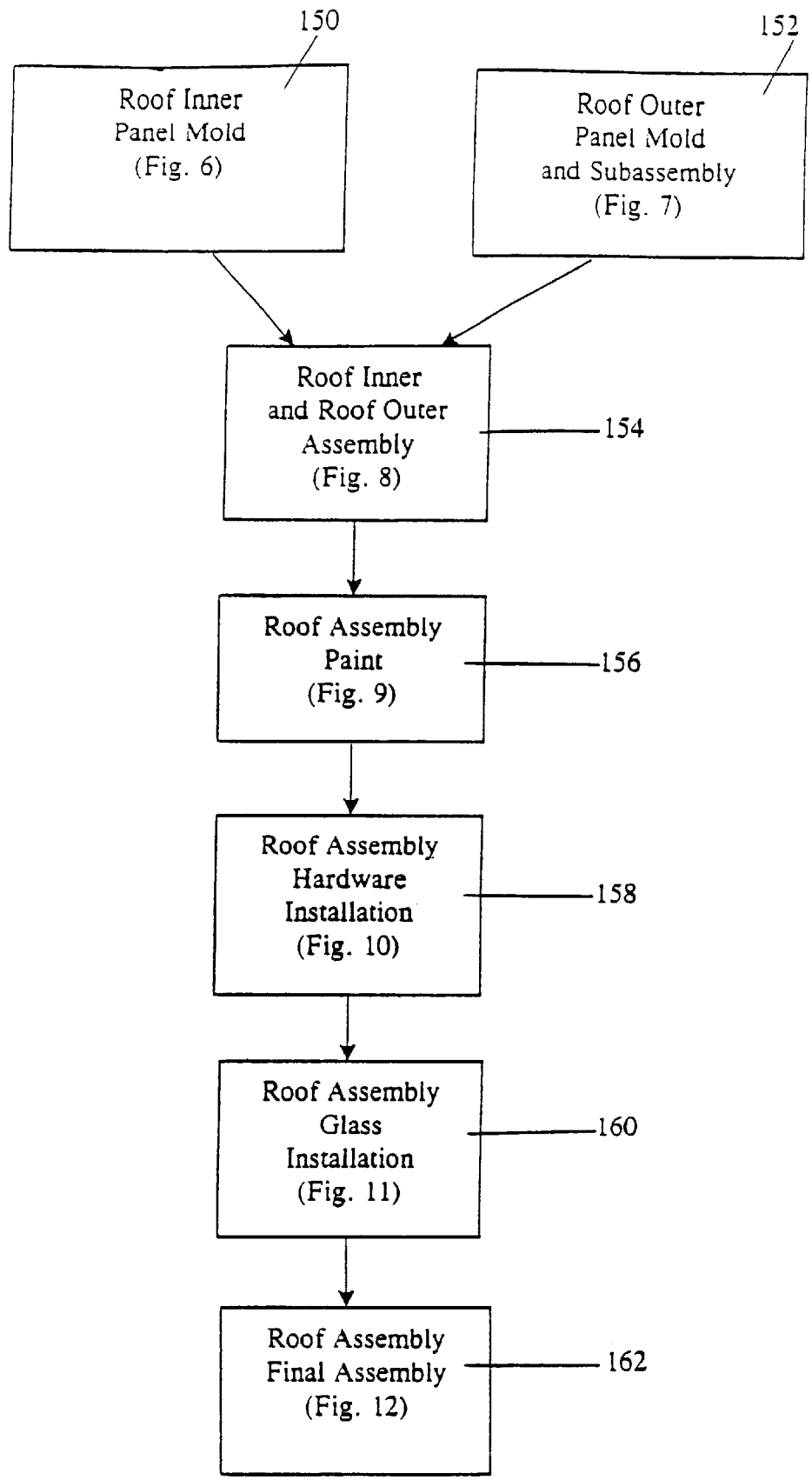
FIG. 5 is a flow chart illustrating the general steps in making a removable roof for a vehicle.

The process for molding and assembling the roof assembly 10 is described with reference to the attached process flow charts. FIG. 5 presents an overview of the hard top assembly process. Each step of the overview flow chart refers to subsequent figures that illustrate the process in greater detail.

Referring to FIG. 5, general process includes steps of molding the roof inner panel at 150. This general overview also shows the process element of molding the roof outer panel and performing sub assembly at 152. The roof inner panel 14 and roof outer panel 12 sub assemblies are assembled at 154. After the roof inner 14 and outer panels 12 are assembled together at 154 the roof assembly 10 is painted at 156. After painting, the roof assembly 10 hardware is installed at 158. The roof assembly glass installation process steps are represented by reference number 160. The roof assembly 10 undergoes final assembly steps at 162.

Figure 6:
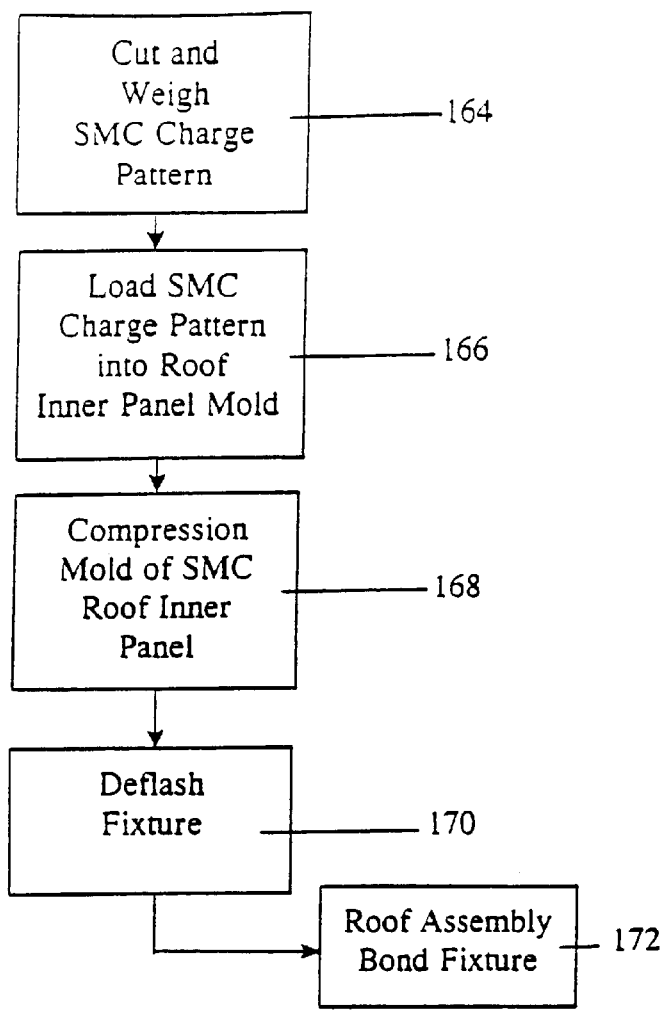
FIG. 6 is a flow chart showing the steps required to mold an inner roof panel and assembling parts to the panel.

Referring now to FIG. 6, molding of the roof inner panel 14 is depicted. A sheet molding compound (hereinafter "SMC") charge is cut and weighed according to a predetermined pattern at 164. The SMC charge pattern is loaded into the roof inner panel mold at 166. The SMC is molded by compression molding to form the general structure of the roof inner panel to near net size and shape at 168. The deflashing step 170 includes the step of deflashing the edges of the roof inner panel 14 and cutting the window openings. The roof inner panel 14 is transferred to a roof assembly bond fixture represented by reference number 172.

Figure 7:
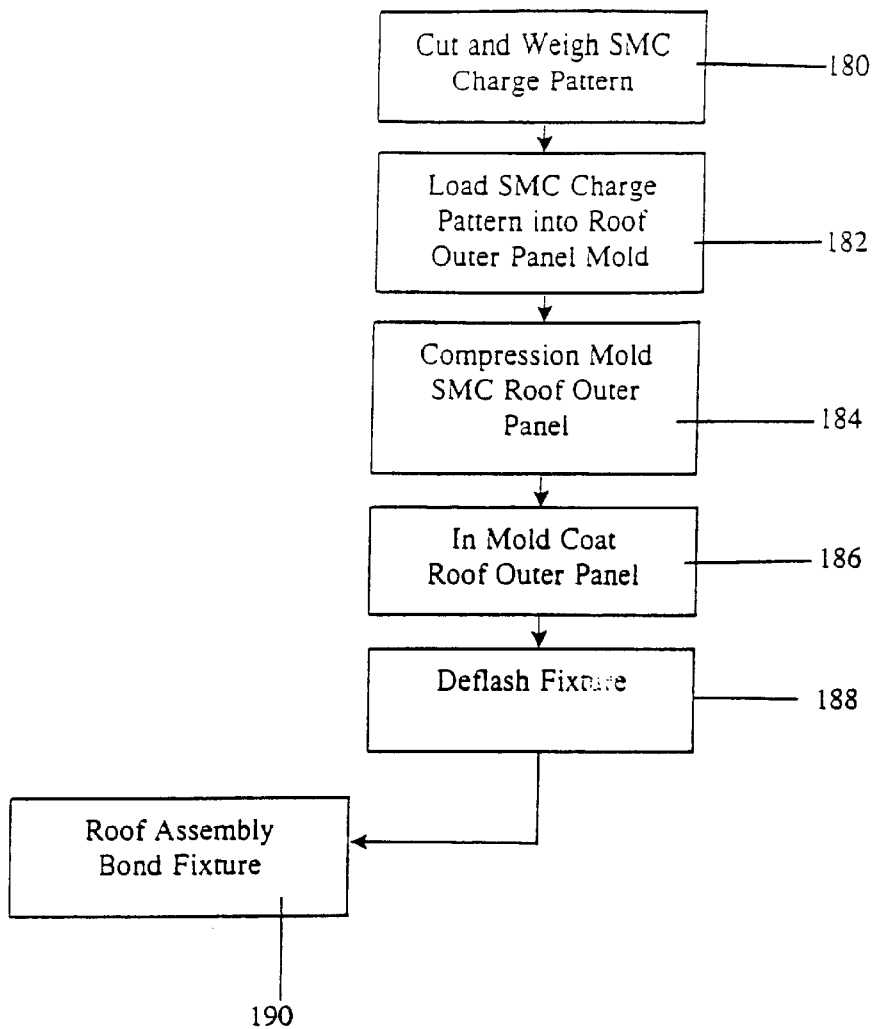
FIG. 7 is a flow chart for molding an outer roof panel.

Referring now to FIG. 7, the roof outer panel mold and sub assembly process is shown to begin with cutting and weighing the SMC charge pattern at 180. The SMC charge pattern is loaded into the roof outer panel mold at 182. The SMC charge is compression molded to form the roof outer panel 12 at 184. After forming, the roof outer panel 12 is coated in the mold at 186. The roof outer panel 12 is deflashed at 188 wherein the perimeter of the roof outer panel is deflashed and the side window openings are cut. The roof outer panel 12 is then transferred from the deflash fixture to the roof assembly bond fixture as represented by reference number 190.

Figure 8:
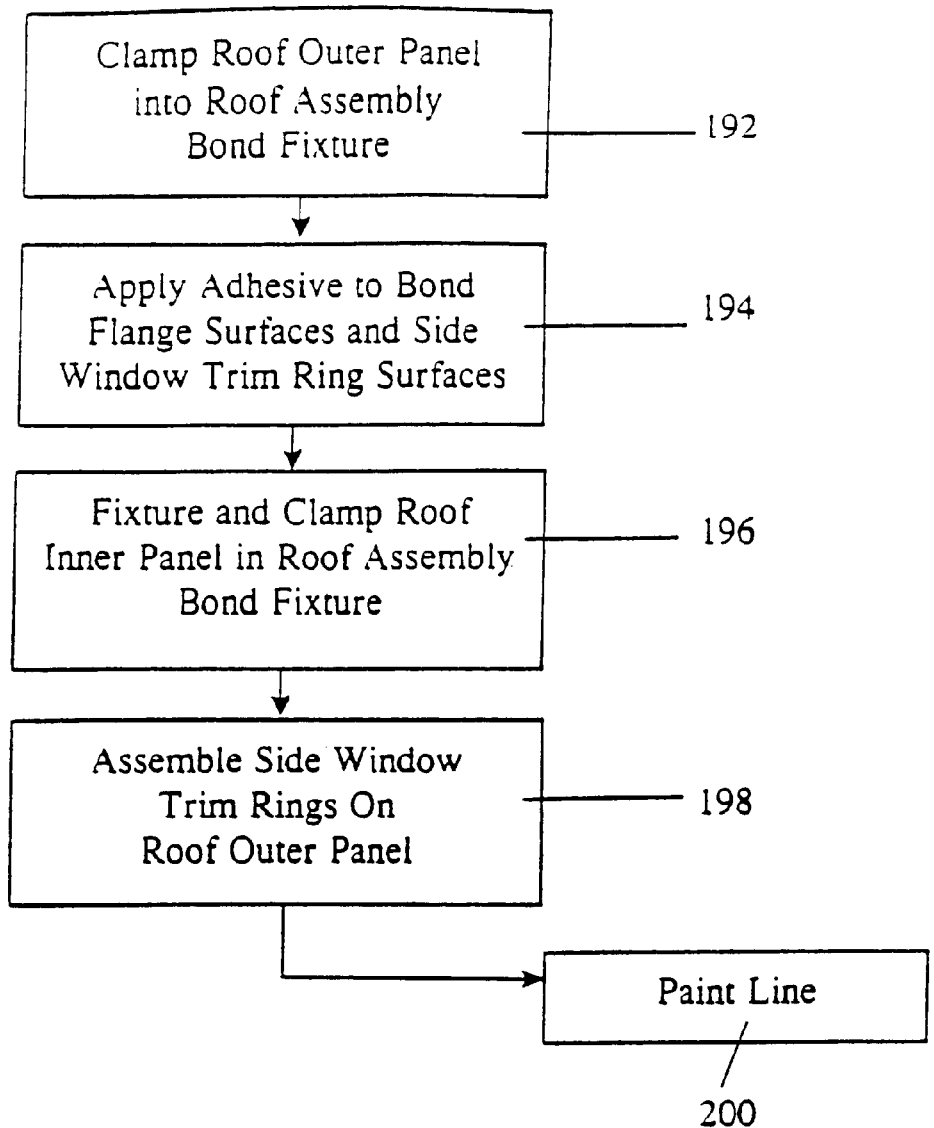
FIG. 8 is a flow chart showing the process steps for assembling an inner roof and outer roof together as a sub-assembly.

Referring now to FIG. 8, the roof inner panel 14 and roof outer panel 12 sub assembly process is described in greater detail. The roof outer panel is first clamped into the roof assembly bond fixture at 192. An adhesive is applied to bond flange surfaces and side window trim ring surfaces at 194. The roof inner panel is then fixtured and clamped in the roof assembly bond fixture at 196. The side window trim rings 100 are assembled on the roof outer panel 12 at 198. The inner and outer roof sub assembly is then transferred from the roof assembly bond fixture to the paint line at 200.

Figure 9:
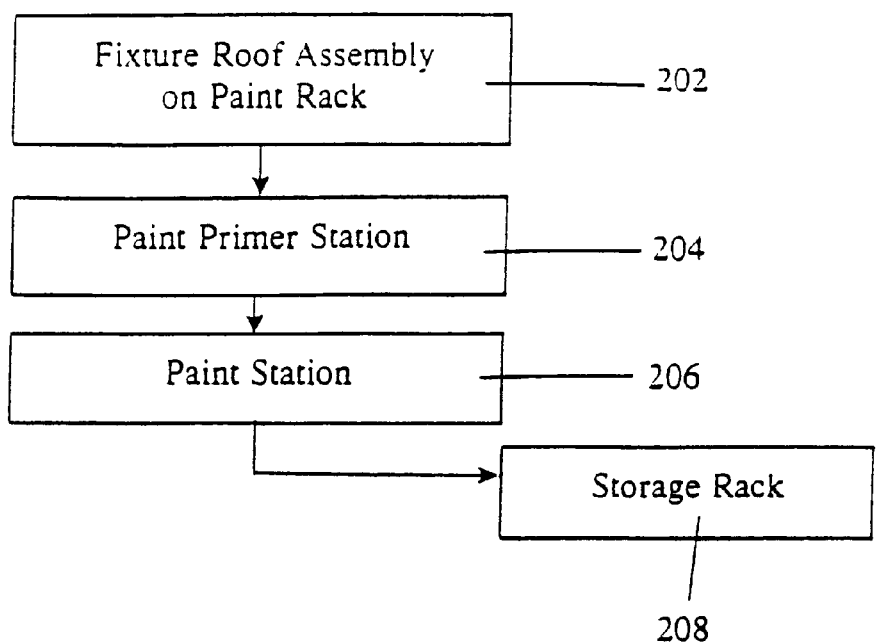
FIG. 9 is a flow chart showing the process steps for painting a roof assembly.

Referring now to FIG. 9, the roof assembly painting process is shown to include fixturing the roof inner and outer assembly 10 on a paint rack at 202. The inner and outer roof assembly 10 is then painted in the paint primer station at 204. Roof assembly 10 is then painted at the paint station 206 and then is transferred to a storage rack 208.

Figure 10:
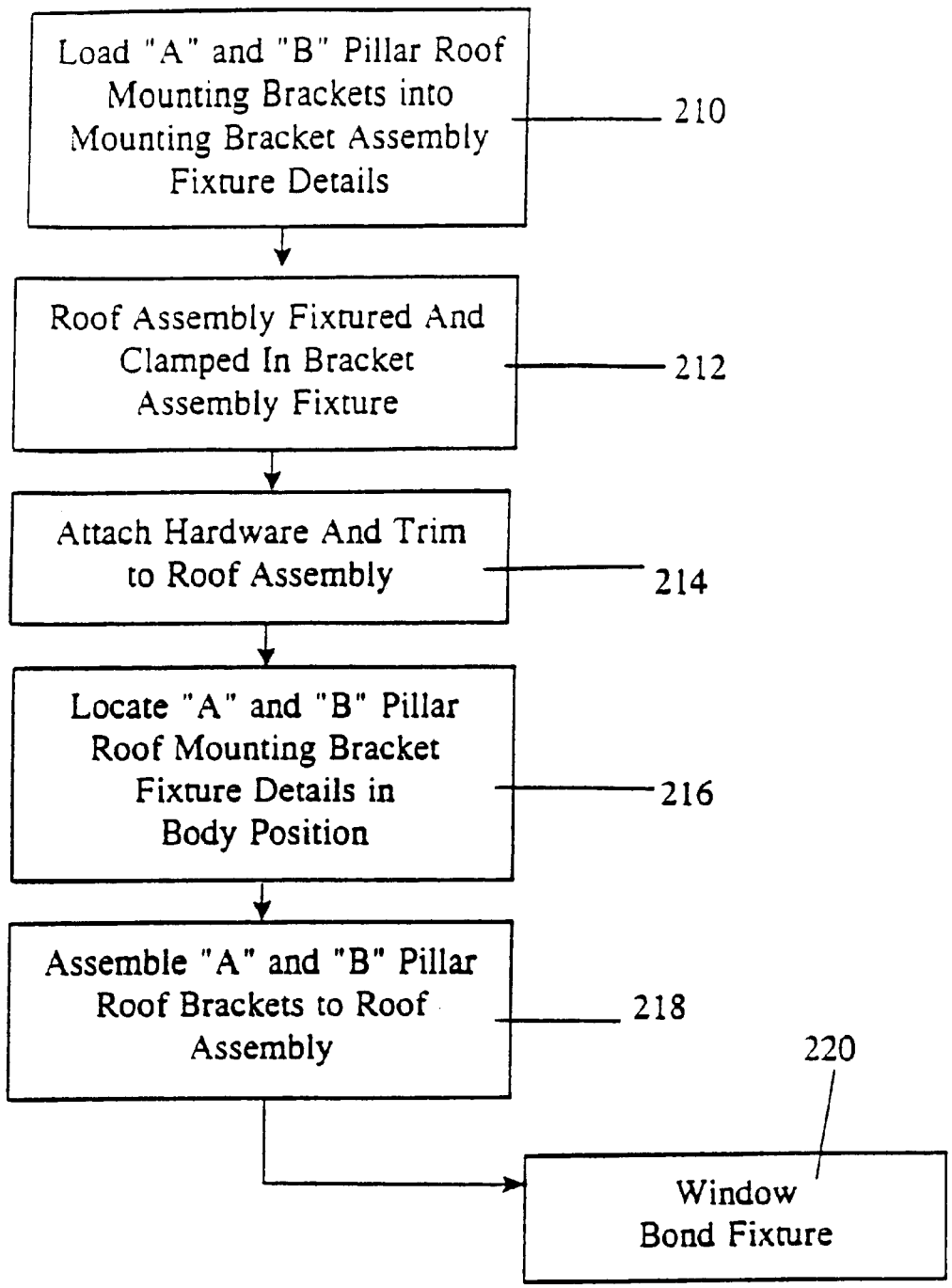
FIG. 10 is a flow chart showing the process steps for assembling hardware to the roof assembly.

Referring now to FIG. 10, hardware attachment to the roof assembly 10 is shown in detail. The A and B pillar roof mounting brackets 40 and 112 are loaded into the mounting bracket assembly fixture at 210. The roof assembly is fixtured and clamped in the bracket assembly fixture at 212. Hardware and trim parts are attached to the roof assembly at 214. The A and B pillar roof mounting bracket fixture details are located in body position at 216. The A and B pillar roof brackets 40 and 112 are then assembled to the roof assembly at 218. The roof assembly with hardware attached is then transferred to the window bond fixture at 220.

Figure 11:
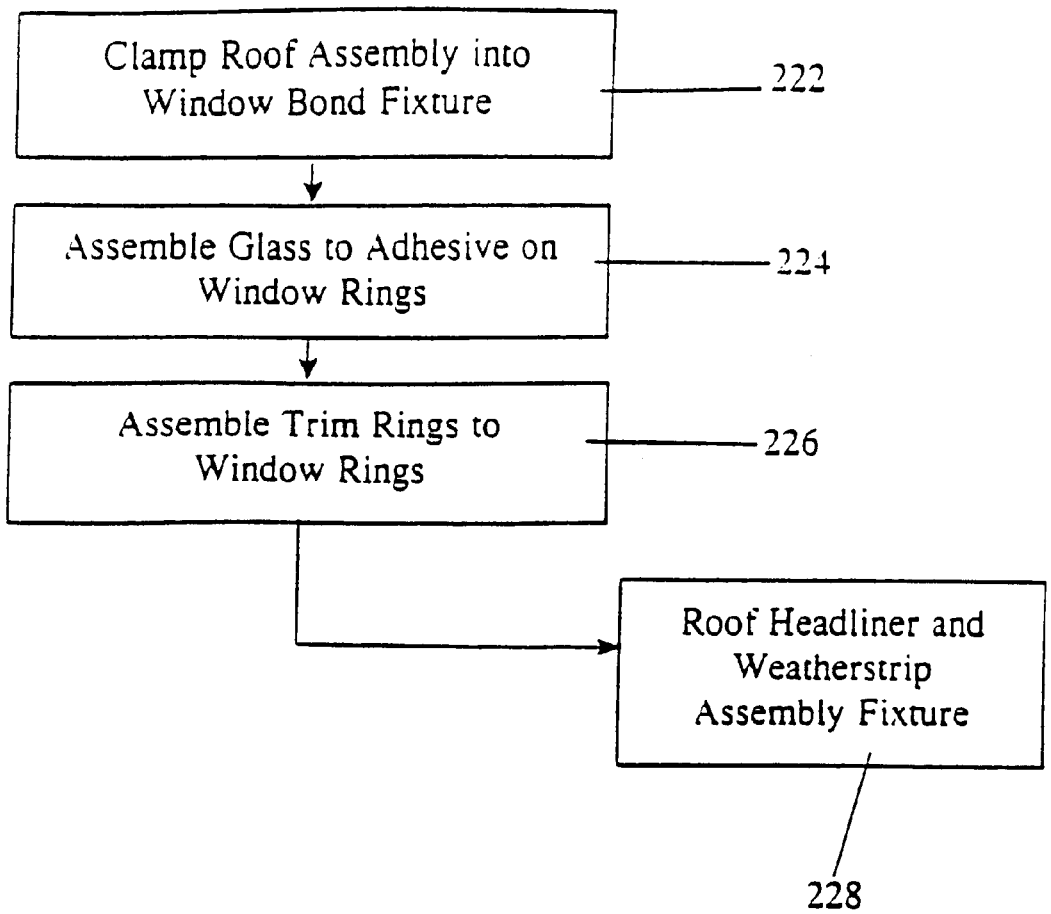
FIG. 11 is a flow chart showing the process steps for installing side window glass and trim rings to a roof assembly.

Referring now to FIG. 11, installation of glass in the roof assembly is described in more detail. The roof assembly is clamped into the window bond fixture at 222. Glass 96 is assembled to the adhesive on the side window trim rings 100 at 224. The trim rings 98 and 100 are then assembled to the window trim rings at 226. The roof assembly 10 with glass installed is then transferred to the roof head liner and weatherstrip assembly fixture at 228.

Figure 12:
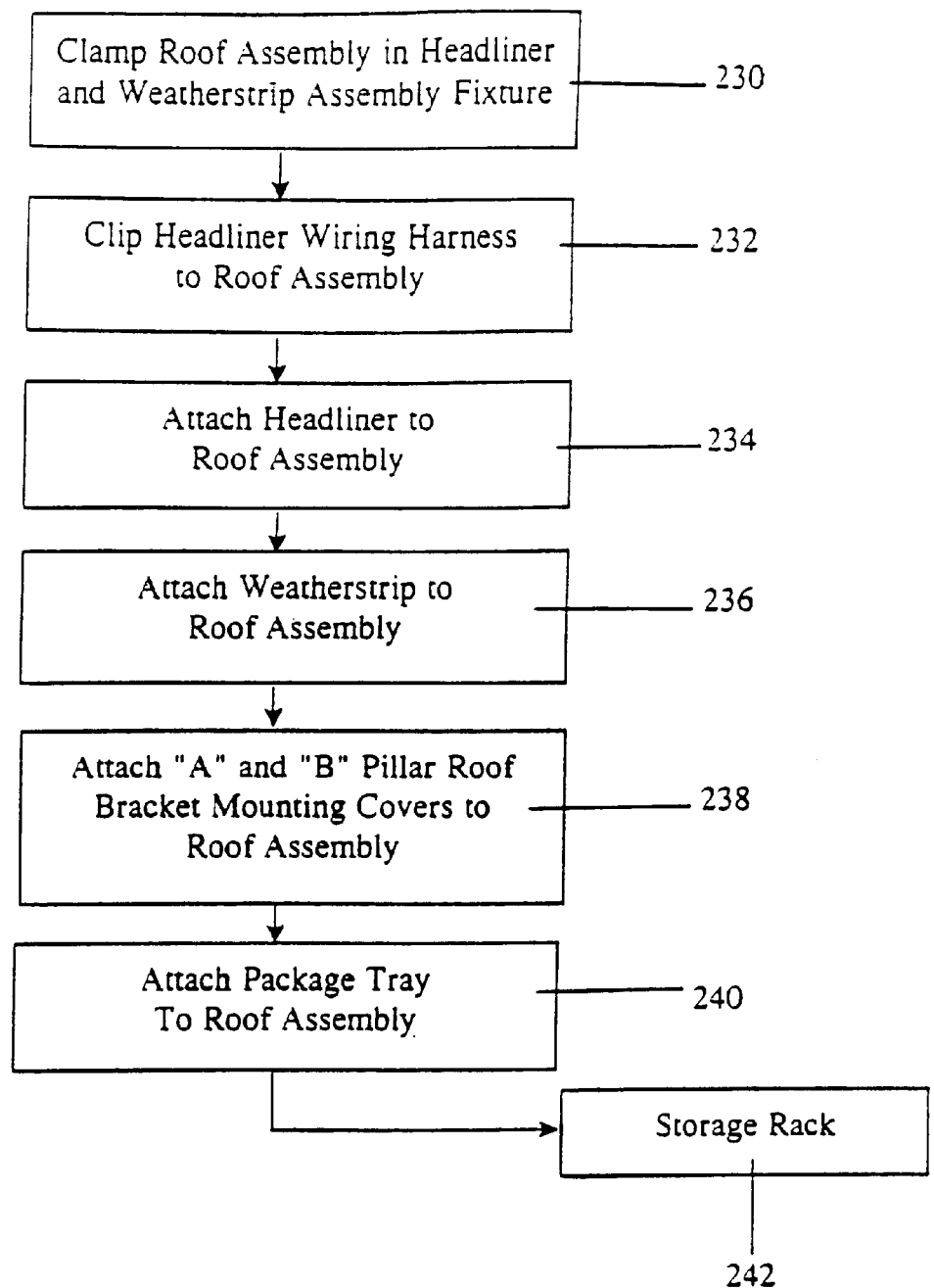
FIG. 12 is a flow chart showing the process steps for final assembly of head liner, weather strips, wiring harness and other parts to a removable roof assembly.

Referring now to FIG. 12, the final assembly steps are described in detail. The roof assembly is clamped in head liner and weather strip assembly fixture at 230. The head liner wiring harness 128 is clipped to the roof assembly at 232 and the head liner 16 is attached to the roof assembly at 234. Weather stripping is attached to the roof assembly at 236. The A and B pillar roof bracket mounting covers 126 are attached to the roof assembly at 238 and the package tray 18 is attached to the roof assembly at 240 prior to being transferred to a storage rack at 242.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A removable roof for a vehicle, the removable roof comprising:
    an outer roof panel manufactured out of plastic, the outer roof panel having an exterior surface and an interior surface;
    an inner roof panel manufactured out of plastic, the inner roof panel having an exterior surface and an interior surface, the inner roof panel further comprising at least one integrally formed roll bar;
    means for attaching the removable roof to the vehicle;
    wherein the exterior surface of the inner roof panel is bonded to the interior surface of the outer roof panel.

2. The removable roof of claim 1 wherein the first and second roof panels have side window openings, and the removable roof further comprises:
    a side window assembled over the side window openings of the inner and the outer roof panels and secured therein by an inner support ring and an outer support ring.

3. The removable top of claim 1 wherein the inner roof panel is manufactured out of a fiber reinforced plastic.

4. The removable top of claim 3 wherein the outer roof panel is manufactured out of a fiber reinforced plastic.

5. The removable roof of claim 1 further comprising:
    a head liner secured to the inner roof panel.

6. The removable roof of claim 1 wherein the means for attaching the removable roof to the vehicle comprise a hold down clamp assembly.

7. The removable roof of claim 6 wherein the hold down clamp assembly is secured to the inner roof panel by hold down clamp mounting plate.

8. The removable roof of claim 1 further comprising a rear window.

9. The removable top of claim 1 further comprising side roof drip moldings, side roof rail weather strips, and side roof inner tapping plate.

10. The removable roof of claim 9 wherein the inner tapping plate is bonded to the inner roof panel prior to assembling the inner roof panel to the outer roof panel to provide a durable member to which the drip molding and weather strip are secured.

11. The removable roof of claim 1 further comprising a side molding retainer secured to the exterior surface of the outer roof panel.

* * * * *